Patented Mar. 28, 1944

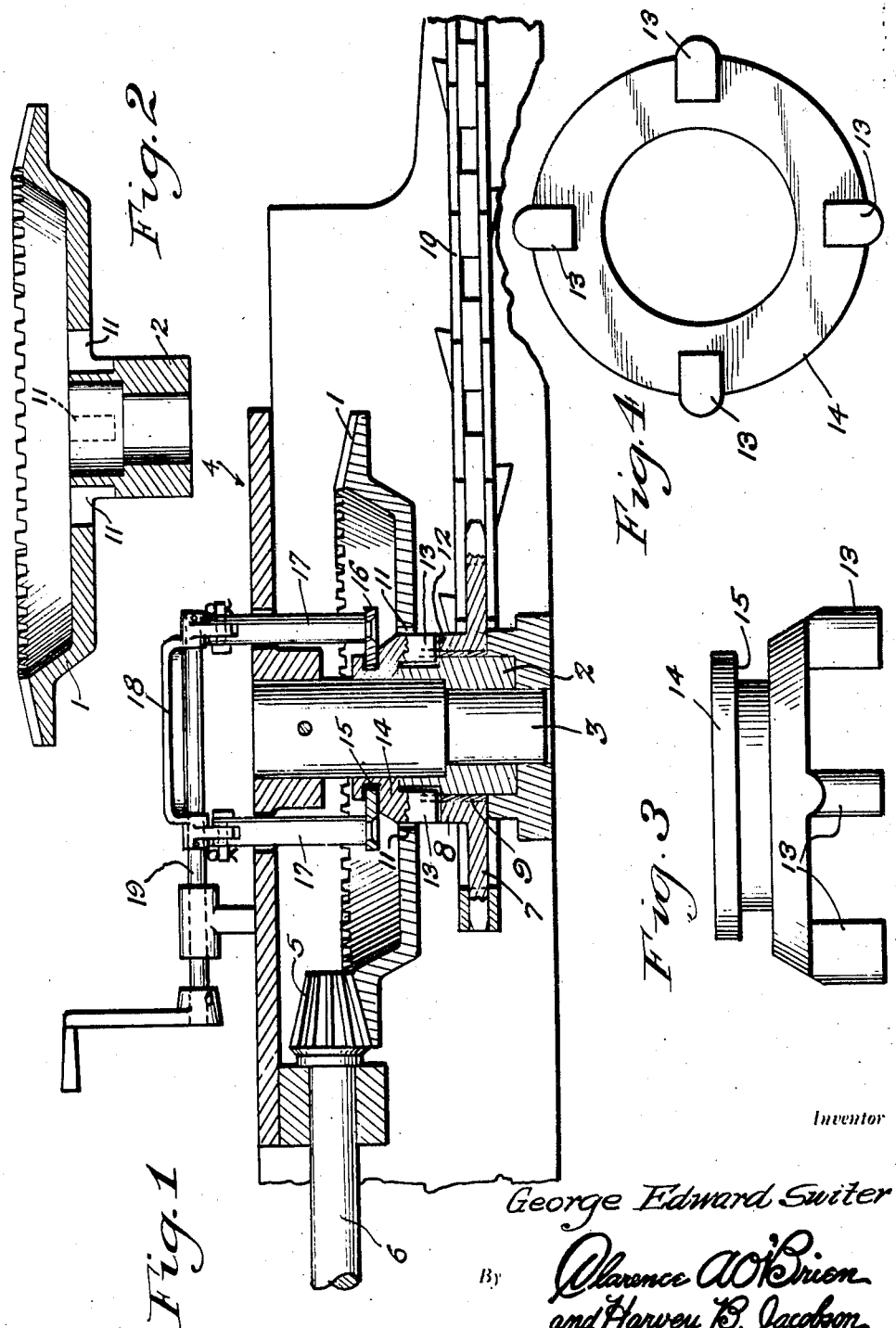

2,345,303

UNITED STATES PATENT OFFICE 2,345,303

MINING MACHINE

George Edward Suiter, Logan, W. Va., assignor of fifty per cent to All-State Equipment Co., Incorporated, Logan, W. Va., a corporation of West Virginia Application October 23, 1942, Serial No. 463,121

1 Claim. (Cl. 262—28)

The present invention relates generally to new and useful improvements in coal mining machines of the type comprising an endless cutter operable in a horizontal plane, and has for its primary object to provide, in a manner as hereinafter set forth, a clutch controlled drive mechanism of a novel construction and arrangement for actuating the cutter.

Other objects of the invention are to provide a driving mechanism of the aforementioned character for mining machine cutters which will be comparatively simple in construction, strong, durable, highly efficient and reliable in operation, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical longitudinal section through an embodiment of the present invention.

Figure 2 is a view in vertical section through the beveled gear.

Figure 3 is an elevational view of the clutch.

Figure 4 is a bottom plan view of the clutch.

Referring now to the drawing in detail, it will be seen that the embodiment of the invention which has been illustrated comprises a beveled gear 1, said gear including a depending hub 2. The hub 2 is journaled on a vertical shaft 3 which is mounted in the frame 4 of the machine. It will thus be seen that the beveled gear 1 is operable in a horizontal plane. A beveled pinion gear 5 on one end portion of a shaft 6 drives the gear 1.

A sprocket wheel 7 is journaled for rotation in a horizontal plane on the hub 2 below the beveled gear 1, said sprocket wheel including an upstanding hub portion 8. A bearing 9 is provided in the sprocket wheel 7. The endless cutter chain 10 of the machine is trained around the sprocket wheel 7.

As illustrated to advantage in Figure 2 of the drawing, the central portion of the beveled gear 1 and the hub 2 have formed therein a plurality of openings 11. Then, the upper end portion of the sprocket wheel hub 8 and the bearing 9 have formed therein notches 12 for registry with the openings 11. The openings 11 and the notches 12 are for the reception of the depending fingers 13 of a vertically movable clutch 14 which, when in operative position, encircles the shaft 3 and rests on the beveled gear 1 for releasably locking said gear and the sprocket wheel 7 together.

The clutch 14 has formed therein an annular channel or groove 15.

The operating means provided for the clutch 14 comprises a ring 16 which is rotatably engaged in the groove 15. Pins 17 rise from the ring 16. A yoke 18 which is fixed on a rockable shaft 19 is operatively connected to the pins 17 for elevating the ring 16.

It is thought that the operation of the invention will be readily apparent from a consideration of the foregoing. Briefly, the clutch 14 rests by gravity in operative position, in which position the fingers 13 are engaged in the openings 11 and the notches 12 for connecting the sprocket wheel 7 to the beveled gear 1. To disconnect the sprocket wheel 7 from the beveled gear 1, the clutch 14 is elevated through the medium of the members 16, 17, 18 and 19 thereby disengaging the fingers 13 from the notches 12. The construction and arrangement is such that the clutch 14 may return to operative position by gravity.

It is believed that the many advantages of a mining machine embodying the present invention will be readily understood, and although a preferred embodiment of said invention is as illustrated and described, it is to be understood that changes in the details of construction and in the combination and arrangement of parts may be resorted to which will fall within the scope of the invention as claimed.

What is claimed is:

A mining machine comprising spaced upper and lower frame members having vertically aligned openings therein, a vertical shaft having its ends mounted in said openings of the frame members, a beveled gear having a depressed central portion and a depending hub resting on the lower frame member, said gear being journaled on the shaft between said frame members for rotation in a horizontal plane, the central portion of said gear and its hub having openings therein, a sprocket wheel for driving an endless cutter chain journaled on the hub and resting on the lower frame member below the gear, said sprocket wheel including an upstanding hub having a plurality of notches therein, a clutch including a collar slidable on the shaft above the depressed central portion of the gear and having depending pins arranged in said openings and engageable in the notches for releasably connecting the sprocket wheel to the gear, said collar having an annular groove, a ring rotatably engaged in said annular groove, pins fixed to opposite sides of the ring and projecting upwardly through the upper frame member, and means connected to the upper ends of the last-named pins for elevating said ring.

GEORGE EDWARD SUITER.